Oct. 28, 1969          A. B. SKROMME            3,474,926
                       MATERIAL UNLOADER
                       Filed Nov. 15, 1967
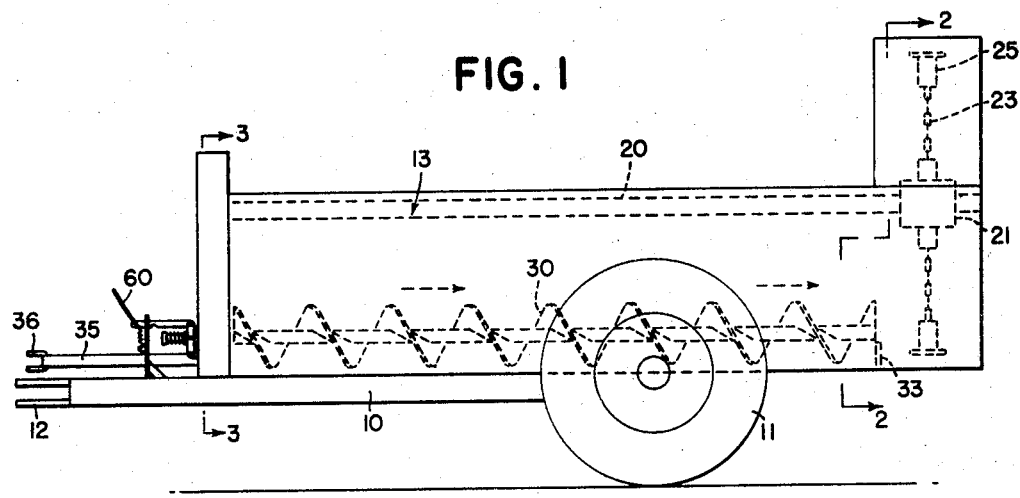
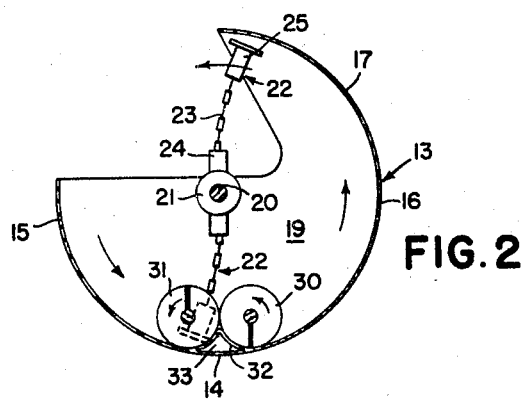
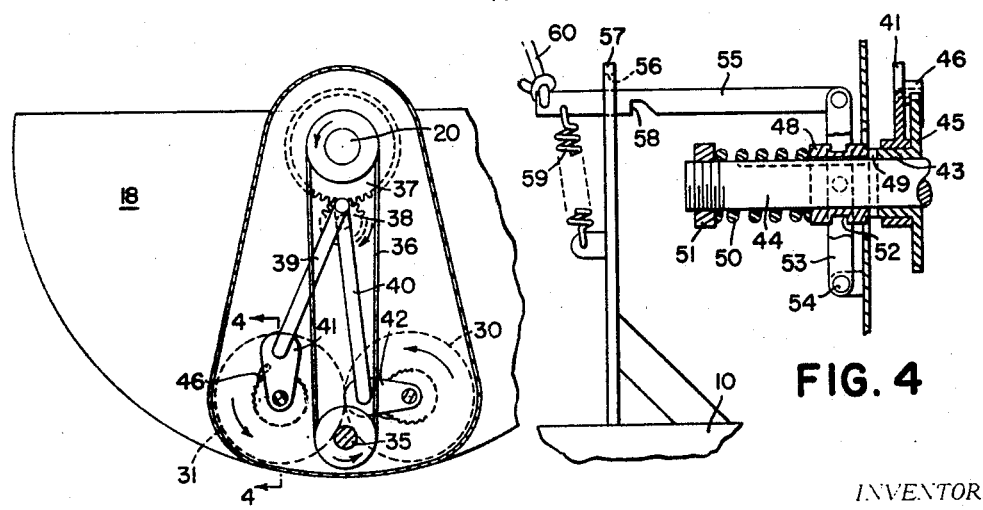
INVENTOR.
A. B. SKROMME
BY William A. Murray
ATTORNEY

3,474,926
MATERIAL UNLOADER
Arnold Burton Skromme, Moline, Ill., assignor to Deere & Company, Moline, Ill., a corporation of Delaware
Filed Nov. 15, 1967, Ser. No. 683,189
Int. Cl. B60p *1/00;* A01c *3/06*
U.S. Cl. 214—519                                6 Claims

ABSTRACT OF THE DISCLOSURE

A material discharge wagon composed of an elongated upwardly opening material container supported on a mobile frame; a rotatable main shaft supported longitudinally on the container in spaced relation above the floor; a flail structure supported on the shaft adjacent one end of the container and adapted to discharge material over one side of the container; a hood at the end of the container for guiding material over the side; and a pair of augers on the floor or base of the container beginning at the opposite end of the container and extending longitudinally to discharge ends adjacent the flail structure.

BACKGROUND OF THE INVENTION

This invention relates to a flail-type spreader with a flail structure positioned adjacent one end of an elongated container and which operates to drive material over one side of the container. The invention also relates to auger means in the base of the material container that is longitudinally disposed so as to feed material the entire length of the container to the flail device.

The use of flails for discharging material over a side of a material container is old as shown in U.S. Patent 2,886,332 which issued to Keith D. Elwick on May 12, 1959. This patent provides for an elongated container with a main shaft extending longitudinally the full length of the container. Flails are supported on the shaft throughout the entire length of the container. When in operation the flails initially tend to wrap around the shaft and then as material is discharged out of the container, the flails tend to unwrap progressively until the entire container is emptied of material. This type of material unloader is used primarily for the purpose of unloading manure.

A difficulty encountered with this type of material unloader is that there is required a large amount of power to drive the shaft and the entire quantity of flails. This is particularly so when the shaft is initially rotated and the flails are first drawn through the material. It has been necessary in most instances to use a large horsepower tractor to drive the shaft. Consequently such a material unloader is limited in size since a large loader would require power that is not available in small and medium size tractors.

SUMMARY OF THE INVENTION

With the above in mind, it is the primary object of the present invention to utilize a relatively small flail device at one end of the material container and to further utilize an auger-type conveyor above the underside of the container which will feed material to the flail device. Thus, the flail, even if it should be buried in manure, being relatively small, can be forced to rotate initially without a great load on the tractor.

It is a further object of the invention to provide a drive means for both the flail device and for the auger floor conveyor which can selectively operate either the flail or auger conveyor in unison or individually. Thus, upon initial rotation of the flail, should it be desired to reduce the horsepower requirements of the material unloader, the auger or floor conveyor may be shut off. Once the flail has begun to rotate and the power requirements reduced to continue rotation thereof, the auger or floor conveyor may then be operated to move material to the flail area of the container.

BRIEF DESCRIPTION OF THE DRAWINGS

FIG. 1 is a side view of the material unloading implement.

FIG. 2 is a sectional view taken substantially along the line 2—2 of FIG. 1.

FIG. 3 is an enlarged sectional view taken substantially along the line 3—3 of FIG. 1.

FIG. 4 is a sectional view taken substantially along the line 4—4 of FIG. 3.

DESCRIPTION OF THE PREFERRED EMBODIMENT

The material unloader is composed of a main mobile frame 10 carried on a pair of transversely spaced transport wheels 11. The frame 10 has a forwardly positioned clevis-type connection 12 that may be used to connect the entire implement to a tractor drawbar. Mounted on the frame 10 is an elongated fore-and-aft extending material container 13 that is semisymmetrical shaped throughout its length, the latter having a rounded underside 14 and a pair of vertically extending sides 15, 16. At the rear end of the container 13 there is provided a relatively short hood section 17 that extends upwardly and over the rear portion of the container. The container is closed at its front and rear ends by front and rear walls 18, 19 respectively.

Journaled on the front and rear walls 18, 19 is a main shaft 20 that extends longitudinally of the container 13. On the rear end of the shaft 20 is a flail structure that includes a hub portion 21 and a pair of flail elements 22 that includes chains 23 that are fixed to arms 24 on the hub 21 and hammer elements 25 on the outer ends of the chains 23. The entire flail structure is supported on the rear end of the shaft 20 and generally within the hood 17. As will be apparent from viewing FIG. 2, the hood 17 and the rear portion of the container 13 form substantially three-quarters of a cylinder and consequently the hood 17 will prevent material from moving over one side 16 of the container and will guide it over the other side 15 of the container.

Positioned forwardly of the flail structure is a pair of augers 30, 31 that rides on the bottom 14 of the container 13. The augers 30, 31 are in side-by-side disposition and panel means 32 are provided between the augers 30, 31 with the panel means 32 extending from a point beneath the respective augers 30, 31 upwardly and inwardly. As will be clearly apparent from viewing FIG. 2, the panel means 32 form with the respective sides of the container 13 a pair of auger troughs which may be utilized to move material rearwardly. The discharge ends of the augers 30, 31 and the rear end of the panel means 32 terminate just forwardly and adjacent to the flails 22. A vertical panel 33 is provided adjacent the rear ends of the augers and the augers and panel 33 serve as a wall to prevent material from moving back into the container by the flails 22. The augers are supported to rotate so that material will be driven rearwardly into the path of the flails.

Drive means are provided for the material unloader and include a main drive shaft 35 that extends forwardly from the front wall 18 and has a connection 36 at its forward end that may be connected to a suitable drive shaft, not shown, driven by a tractor. The flail shaft 20 is driven by the shaft 35 through a belt drive 36. Also fixed to rotate with the shaft 20 is a gear pinion 37 meshing with a small gear 38 that has pinned thereto a pair of links 39, 40. The links 39, 40 are pivotally connected to the gear 38. The lower ends of the links 39, 40 are connected to arms 41, 42 respectively.

Referring now to FIG. 4 which shows the drive connection for the auger 31, the arm 41 has a hub portion rotatably mounted on the outer surface of a ratchet hub 43 which in turn is rotatably mounted on the auger shaft 44. The ratchet 45 is driven by a pawl 46 carried on the arm 41. Consequently each rotation of the gear 38 advances the ratchet 45 a short angular distance in respect to the auger drive shaft 44. Keyed to the shaft 44 is a clutch part 48. The clutch part 48 and the end of the hub 43 have intermeshing clutch jaws at 49 and consequently the ratchet 45 will cause through the clutch part 48 rotation of the shaft 44. Clutch part 48 is held in engagement with the end of the hub 43 by means of a spring 50 that is held on the shaft 44 by a collar 51. The clutch part 48 has an annular recess 52 that receives a clutch lever 53 pivoted at 54 on the main frame 10. The upper end of the lever is connected to a link 55 that extends forwardly through a slot 56 in an upright structural plate 57. The link 55 is notched at 58 and the forward end of the link 55 is biased downwardly by a spring 59. Consequently as the link 55 is drawn forwardly and released the notch 58 will catch against the front surface of the plate 57 and will hold the clutch part 48 out of engagement. The forward end of the link 55 is provided with a remote control in the form of a rope 60 that may extend forwardly to an operator's station on the tractor. The rope 60 may be drawn first upwardly and then permitted to release rearwardly so as to release the notch 58 from engagement with the plate 57. Consequently it is obvious that the flail means may rotate while at the same time the clutch part 48 is held in disengagement so that the auger 31 does not rotate. A similar clutch arrangement is provided for the auger 30 and consequently either one or both of the augers may be moved to an inoperative position.

In operation and at the time it becomes desirable to discharge material, the material will be stacked high in the container 13 and will no doubt cover a good portion of the flail structure. Consequently it will probably be in order that the flail structure be permitted to rotate while the augers are disengaged from the drive so that the entire power of the tractor may be utilized to rotate the flail structure. Upon the flail structure clearing the area within the hood 17, the augers 30, 31 may be engaged to rotate and material will be moved rearwardly into the path of the flails 22. Should at any time it be desired to clear the area beneath the hood of material, the clutch parts 48 may be disengaged and held in disengagement until the hood portion of the container is cleared. Consequently an operator seated in a remote position such as on the operator's station of the tractor may control his augers 30, 31 and his flails 22 in such a manner as to prevent clogging of the unit and to reduce the power requirements when such is necessary, the latter being done by the mere disengagement of the auger drives.

I claim:

1. A material discharge wagon comprising a mobile frame; an elongated upwardly opening material container having a floor and opposite vertically extending sides and closed at opposite ends with at least one end portion having a rounded underside; a rotatable main shaft supported on and extending longitudinally of the container spacedly above the floor; a flail structure supported on the shaft adjacent the one end portion of the container and including at least one flexible flail device adapted to bend about the shaft and to extend to a maximum length terminating closely adjacent the rounded underside and when rotating to move in sequence from the underside upwardly alongside one of the vertically extending sides, from thence over the shaft, and from thence downwardly alongside the other vertically extending side; a hood at the end of the container extending upwardly from said one side of the container transversely over the flail structure and terminating above the said other side whereby the flail structure may drive material over the other side of the container; auger means in the bottom of the container extending from the opposite end of the container to a discharge end adjacent the flail structure; and a drive means supported on said opposite end of the container for operating the shaft and auger means.

2. The structure as set forth in claim 1 further characterized by the auber means being a pair of augers disposed in side-by-side relation, and upwardly convergent panel means between the augers extending from the undersides of the respective augers.

3. The structure as set forth in claim 2 further characterized by the panel means terminating at the discharge ends of the augers and further including a vertical panel substantially vertically aligned with the ends of the augers depending from the edges of the panel means downwardly to the surface of the rounded underside.

4. The structure as set forth in claim 1 further characterized by the drive means being remotedly controlled to permit the auger means to be held inoperative while the flail structure is operating.

5. The structure as set forth in claim 1 further characterized by the drive means being remotely controlled to permit selective operation of the auger means and flail structure.

6. The structure as set forth in claim 1 in which the drive means includes a main drive to the shaft and an intermittent drive between the shaft and the auger means.

References Cited

UNITED STATES PATENTS

| 2,575,639 | 11/1951 | Scranton et al. | |
| 2,645,500 | 7/1953 | Moss | 239—658 |
| 3,011,793 | 12/1961 | McElhinney et al. | 239—658 X |

FOREIGN PATENTS

| 808,582 | 7/1961 | Germany. |
| 3,867 | 10/1919 | Netherlands. |

ALBERT J. MAKAY, Primary Examiner

U.S. Cl. X.R.

214—83.32; 239—658